United States Patent
Ai et al.

(10) Patent No.: US 12,284,608 B2
(45) Date of Patent: Apr. 22, 2025

(54) REFERENCE SIGNALING DESIGN AND CONFIGURATION

(71) Applicant: ZTE Corporation, Guangdong (CN)

(72) Inventors: Jianxun Ai, Guangdong (CN); Jing Liu, Guangdong (CN); He Huang, Guangdong (CN)

(73) Assignee: ZTE Corporation, Shenzhen (CN)

( * ) Notice: Subject to any disclaimer, the term of this patent is extended or adjusted under 35 U.S.C. 154(b) by 358 days.

(21) Appl. No.: 17/737,016

(22) Filed: May 4, 2022

(65) Prior Publication Data

US 2022/0264454 A1 Aug. 18, 2022

Related U.S. Application Data

(63) Continuation of application No. PCT/CN2019/116242, filed on Nov. 7, 2019.

(51) Int. Cl.
*H04W 52/02* (2009.01)
*H04W 72/0453* (2023.01)

(52) U.S. Cl.
CPC ... *H04W 52/0216* (2013.01); *H04W 72/0453* (2013.01)

(58) Field of Classification Search
CPC ......... H04W 52/0216; H04W 72/0453; H04W 36/08; H04W 76/38
See application file for complete search history.

(56) References Cited

U.S. PATENT DOCUMENTS

| | | | |
|---|---|---|---|
| 11,019,674 B2 | 5/2021 | Hong | |
| 2012/0281566 A1* | 11/2012 | Pelletier | H04W 72/1221 370/252 |
| 2019/0124558 A1 | 4/2019 | Ang et al. | |

(Continued)

FOREIGN PATENT DOCUMENTS

CN 109963296 A 7/2019

OTHER PUBLICATIONS

Taiwanese office action issued in TW Patent Application No. 109130488, dated Apr. 18, 2024, 16 pages. English translation included.

(Continued)

*Primary Examiner* — Kenny S Lin
(74) *Attorney, Agent, or Firm* — Perkins Coie LLP (57) ABSTRACT

Methods, systems, and devices related to digital wireless communication, and more specifically, to techniques related to controlling activation of a BWP upon transitioning between dormancy behavior and non-dormancy behavior. In one exemplary aspect, a method for wireless communication includes transitioning, by a terminal, a serving node from dormancy behavior to non-dormancy behavior. The method also includes activating, by the terminal, a set of resource blocks in response to transitioning the serving node from the dormancy behavior to the non-dormancy behavior. In another exemplary aspect, a method for wireless communication includes detecting, by a terminal, that a dormancy timer has expired. The method also includes, responsive to detecting that the dormancy timer has expired, transitioning, by the terminal, a serving node from non-dormancy behavior to dormancy behavior.

19 Claims, 9 Drawing Sheets

(56) References Cited

U.S. PATENT DOCUMENTS

| | | | | |
|---|---|---|---|---|
| 2019/0150183 | A1* | 5/2019 | Aiba | H04W 24/10 |
| | | | | 370/336 |
| 2019/0182870 | A1 | 6/2019 | Shih et al. | |
| 2019/0253230 | A1* | 8/2019 | Loehr | H04L 5/0098 |
| 2019/0306739 | A1 | 10/2019 | Kim et al. | |
| 2019/0306867 | A1* | 10/2019 | Cirik | H04W 36/0005 |
| 2020/0037248 | A1* | 1/2020 | Zhou | H04L 5/0032 |
| 2020/0053799 | A1* | 2/2020 | Jeon | H04L 5/0048 |
| 2020/0100179 | A1* | 3/2020 | Zhou | H04W 52/0209 |
| 2020/0106573 | A1* | 4/2020 | Cirik | H04W 74/0808 |
| 2020/0145280 | A1* | 5/2020 | Cirik | H04L 41/0668 |
| 2021/0068164 | A1* | 3/2021 | Sato | H04W 56/0045 |
| 2021/0298052 | A1* | 9/2021 | Namba | H04L 1/1851 |
| 2022/0353817 | A1* | 11/2022 | Cheng | H04W 52/0258 |
| 2023/0171688 | A1* | 6/2023 | Xu | H04W 52/0206 |
| | | | | 370/311 |

OTHER PUBLICATIONS

Canadian office action issued in CA Patent Application No. 3,160,516, dated Jun. 9, 2023, 4 pages.

Canadian office action issued in CA Patent Application No. 3,160,516, dated Jan. 25, 2024, 4 pages.

European Search Report for EP Patent Application No. 19951936.4, dated on Sep. 28, 2022, 13 pages.

Qualcomm Incorporated, "Solutions for Fast SCG and SCell Activation," 3GPP TSG-RAN WG1 #96, R1-1903028, Athens, Greece, Feb. 25-Mar. 1, 2019, 6 pages.

Qualcomm Incorporated, "Fast SCG and SCell Activation," 3GPP TSG-RAN WG1 #98, R1-1909287, Prague, Czech Republic, Aug. 26-30, 2019, 11 pages.

Qualcomm Incorporated et al., "Discussion on fast SCell activation based on RAN1 / RAN4 reply LS," 3GPP TSG RAN WG2 Meeting #107b, R2-1912195, Revision based on R2-1905542, Chongqing, China, Sep. 14-18, 2019, 15 pages.

International Search Report and Written Opinion mailed on Jul. 28, 2020 for International Application No. PCT/CN2019/116242, filed on Nov. 7, 2019 (7 pages).

ZTE Corporation, "Discussion on low latency SCell activation", 3GPP TSG RAN WG1 Meeting #98bis, Chongqing, China, R1-1910109, 7 pages, Aug. 20, 2019.

ZTE Corporation et al., "Dormant State for SCells", 3GPP TSG-RAN WG2 Meeting#105, R2-1900803, 7 pages, Feb. 25-Mar. 1, 2019.

Qualcomm Incorporated, "Fast SCell Activation and SCell Dormancy", 3GPP TSG-RAN WG1 #98bis, Chongqing, China, R1-1911139, 19 pages, Oct. 14-20, 2019.

Canadian office action issued in CA Patent Application No. 3,160,516, dated Sep. 16, 2024, 4 pages.

Taiwanese office action issued in TW patent Application No. 109130488, dated Oct. 30, 2024, 10 pages. English translation included.

European Communication pursuant to Article 94(3) EPC issued in EP Patent Application No. 19951936.4, dated Jan. 23, 2025, 4 pages.

* cited by examiner

REFERENCE SIGNALING DESIGN AND CONFIGURATION

CROSS-REFERENCE TO RELATED APPLICATIONS

This application is a continuation of International Patent Application No. PCT/CN2019/116242, filed on Nov. 7, 2019, the contents of which are incorporated herein by reference in their entirety.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, are being discussed.

SUMMARY

This document discloses methods, systems, and devices related to digital wireless communication, and more specifically, to techniques related to controlling activation of a BWP upon transitioning between dormancy behavior and non-dormancy behavior.

In one exemplary aspect, a method for wireless communication includes transitioning, by a terminal, a serving cell from dormancy behavior to non-dormancy behavior. The method also includes activating, by the terminal, a set of resource blocks in response to transitioning the serving cell from the dormancy behavior to the non-dormancy behavior.

In another exemplary aspect, a method for wireless communication includes detecting, by a terminal, that a dormancy timer configured for a group of serving cells has expired. The method also includes transitioning, by the terminal, the group of serving cells from non-dormancy behavior to dormancy behavior responsive to detecting that the dormancy timer has expired.

In another exemplary aspect, a method for wireless communication includes detecting, by a terminal, that a dormancy timer has expired. The method also includes responsive to detecting that the dormancy timer has expired, transitioning, by the terminal, a serving cell from non-dormancy behavior to dormancy behavior.

In another exemplary aspect, a method for wireless communication includes receiving, by the terminal, an uplink activity configuration message from a network cell, the uplink activity configuration message indicative of uplink activities that are capable of being performed by a serving cell in dormancy behavior. The method also includes performing, by the terminal, any uplink activity identified in the uplink activity configuration message by the serving cell in the dormancy behavior.

In another exemplary aspect, a method for wireless communication includes configuring, by a network cell, a set of resource blocks for a terminal to activate in response to the terminal transitioning a serving cell from dormancy behavior to non-dormancy behavior. The method also includes transmitting, by the network cell, a resource configuration message to a terminal, the resource configuration message indicative of the set of resource blocks for the terminal to activate in response to the terminal transitioning the serving cell from dormancy behavior to non-dormancy behavior.

In another exemplary aspect, a method for wireless communication includes configuring, by a network cell, a dormancy timer for a group of serving cells. The method also includes sending, by the network cell, a first message to a terminal indicative of the configured dormancy timer for the group of cells.

In another exemplary aspect, a wireless communications apparatus comprising a processor is disclosed. The processor is configured to implement a method described herein.

In yet another exemplary aspect, the various techniques described herein may be embodied as processor-executable code and stored on a computer-readable program medium.

Some embodiments may preferably implement the following solutions, written in a clause-format.

1. A solution for wireless communication, comprising: transitioning, by a terminal, a serving cell from dormancy behavior to non-dormancy behavior; and activating, by the terminal, a set of resource blocks in response to transitioning the serving cell from the dormancy behavior to the non-dormancy behavior.

2. The solution of clause 1, wherein the set of resource blocks is a default bandwidth part (BWP) configured for the terminal.

3. The solution of clause 2, wherein the set of resource blocks includes an initial BWP when the default BWP is not configured.

4. The solution of clause 1, wherein the set of resource blocks includes a first active BWP.

5. The solution of clause 1, wherein the serving cell is transitioned responsive to receiving a resource configuration message from a network cell that includes a radio resource control (RRC) message.

6. The solution of clause 1, wherein the serving cell is transitioned responsive to receiving a resource configuration message from a network cell that includes a medium access control (MAC) message.

7. The solution of clause 1, wherein the serving cell is transitioned responsive to receiving a resource configuration message from a network cell that includes downlink control information (DCI).

8. The solution of any of clauses 5-7, wherein the resource configuration message is indicative of a group of serving cells.

9. A solution for wireless communication, comprising: detecting, by a terminal, that a dormancy timer configured for a group of serving cells has expired; and transitioning, by the terminal, the group of serving cells from non-dormancy behavior to dormancy behavior responsive to detecting that the dormancy timer has expired.

10. The solution of any of clauses 5-7, wherein the resource configuration message is indicative of a primary serving cell included in a cell group.

11. The solution of clause 10, further comprising: transitioning, by the terminal, the primary serving cell and cells included in the cell group from non-dormancy behavior to dormancy behavior responsive to an expiration of a dormancy timer.

12. A solution for wireless communication, comprising: detecting, by a terminal, that a dormancy timer has expired; and responsive to detecting that the dormancy timer has expired, transitioning, by the terminal, a serving cell from non-dormancy behavior to dormancy behavior.

13. The solution of clause 12, further comprising: starting, by the terminal, the dormancy timer upon a set of resource blocks switching to a specified BWP.

14. The solution of clause 12, further comprising: restarting, by the terminal, the dormancy timer upon performing data transmission on a specified BWP.

15. The solution of any of clauses 13 and 14, further comprising: stopping, by the terminal, the dormancy timer responsive to switching a set of resource blocks to another BWP that does not include the specified BWP.

16. The solution of clause 12, wherein transitioning from the non-dormancy behavior to the dormancy behavior includes switching a set of resource blocks to a dormant BWP.

17. The solution of any of clauses 13-15, wherein the specified BWP is any of a default BWP, an initial BWP, and a BWP configured by the network cell.

18. A solution for wireless communication, comprising: receiving, by the terminal, an uplink activity configuration message from a network cell, the uplink activity configuration message indicative of uplink activities that are capable of being performed by a serving cell in dormancy behavior; and performing, by the terminal, any uplink activity identified in the uplink activity configuration message by the serving cell in the dormancy behavior.

19. The solution of clause 18, wherein the uplink activity configuration message includes a bitmap with one bit representative of each configured uplink activity capable of being performed by the serving cell in the dormancy behavior.

20. A solution for wireless communication, comprising: configuring, by a network cell, a set of resource blocks for a terminal to activate in response to the terminal transitioning a serving cell from dormancy behavior to non-dormancy behavior; and transmitting, by the network cell, a resource configuration message to a terminal, the resource configuration message indicative of the set of resource blocks for the terminal to activate in response to the terminal transitioning the serving cell from dormancy behavior to non-dormancy behavior.

21. The solution of clause 20, wherein the set of resource blocks is a default bandwidth part (BWP) configured by the network cell.

22. The solution of clause 21, wherein the set of resource blocks includes an initial BWP when the default BWP is not configured by the network cell.

23. The solution of clause 20, wherein the set of resource blocks includes a first active BWP.

24. The solution of clause 20, wherein the resource configuration message includes a radio resource control (RRC) message.

25. The solution of clause 20, wherein the resource configuration message includes a medium access control (MAC) message.

26. The solution of clause 20, wherein the resource configuration message includes downlink control information (DCI).

27. The solution of any of clauses 24-26, wherein the resource configuration message is indicative of a group of serving cells.

28. A solution for wireless communication, comprising: configuring, by a network cell, a dormancy timer for a group of serving cells; and sending, by the network cell, a first message to a terminal indicative of the configured dormancy timer for the group of cells.

29. The solution of clause 28, wherein the terminal is configured to transition the group of serving cells from non-dormancy behavior to dormancy behavior responsive to an expiration of the dormancy timer.

30. The solution of any of clauses 24-26, wherein the resource configuration message is indicative of a primary serving cell included in a cell group.

31. The solution of clause 30, wherein the terminal is configured to transition the primary serving cell and cells included in the cell group from non-dormancy behavior to dormancy behavior responsive to an expiration of a dormancy timer.

32. An apparatus for wireless communication comprising a processor that is configured to carry out the solution of any of solutions 1 to 31.

33. A non-transitory computer readable medium having code stored thereon, the code when executed by a processor, causing the processor to implement a solution recited in any of solutions 1 to 31.

The details of one or more implementations are set forth in the accompanying attachments, the drawings, and the description below. Other features will be apparent from the description and drawings, and from the clauses.

DETAILED DESCRIPTION

Section headings are used in the present document only for ease of understanding and do not limit scope of the embodiments to the section in which they are described. Furthermore, while embodiments are described with reference to 5G examples, the disclosed techniques may be applied to wireless systems that use protocols other than 5G or 3GPP protocols.

The development of the new generation of wireless communication—5G New Radio (NR) communication—is a part of a continuous mobile broadband evolution process to meet the requirements of increasing network demand. NR will provide greater throughput to allow more users connected at the same time. Other aspects, such as energy consumption, device cost, spectral efficiency, and latency are also important to meeting the needs of various communication scenarios.

Overview

In 3GPP NR, dormancy actions of a serving cell have been introduced to preserve user equipment (UE) power. Particularly, when a serving cell transitions into a dormancy behavior, the UE may not be required to monitor a channel (e.g., physical downlink control channel (PDCCH)) on the serving cell. The UE may also keep a channel state information (CSI) measurement on the serving cell to maintain automatic gain control (AGC) and time/frequency synchronization to minimize a delay in transitioning the serving cell from a dormancy behavior to a non-dormant (or active) state.

In many cases, activating dormancy behavior of a serving cell is implemented by configuring a bandwidth part (BWP) without PDCCH configuration. This BWP may be referred to as a dormant BWP of the serving cell. In the event that a BWP of a serving cell is a dormant BWP, the serving cell may be in a dormancy behavior. Otherwise, the serving cell may be in an active state. The base station (BS) may transition a serving cell to a dormancy behavior via L1 signaling (i.e. DCI).

In many cases, a BS may transition multiple serving cells from a dormancy behavior to a non-dormancy behavior by transmitting a DCI. The DCI may include a bitmap with each bit in the bitmap representing a serving cell or a serving cell group. Upon reception of the DCI, a UE may transition a corresponding serving cells from a dormancy behavior to a non-dormancy behavior by performing BWP switching.

The detailed UE behavior relating to uplink activity on a serving cell in a dormancy behavior, where a BWP is activated when transition a serving cell from a dormancy behavior and how to implement an autonomous transition between a dormancy behavior and active state may be unclear.

System Overview

The present embodiments relate to UE behavior in transitioning a serving cell between a dormancy behavior and a non-dormancy behavior. Particularly, the present embodiments may relate to controlling activation of a BWP upon transitioning from a dormancy behavior to a non-dormancy behavior.

Figure 1:
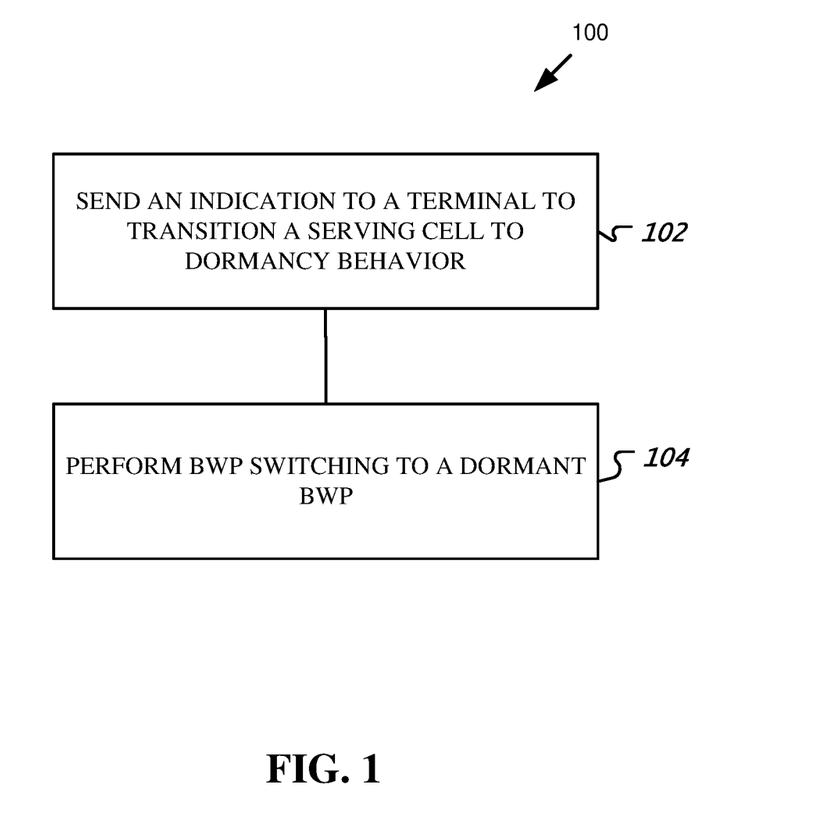
FIG. 1 illustrates a block diagram of an example method for performing BWP switching to a dormant BWP.

FIG. 1 illustrates a block diagram of an example method 100 for performing BWP switching to a dormant BWP. The method may include a base station sending an indication to a terminal to transition a serving cell to dormancy behavior (block 102). The method may also include performing BWP switching to a dormant BWP (block 104).

A UE may activate a BWP upon transitioning from dormancy behavior. The BWP may include any of a default BWP, an initial BWP if a default BWP is not configured, a first active BWP, a BWP configured by a BS via RRC/MAC/DCI, and a BWP ID indicated by a BS in a DCI used to transition multiple serving cells from a dormancy behavior to a non-dormancy behavior.

A UE may automatically transition to a dormancy behavior. A dormant BWP timer may be defined to automatically transition to a dormancy behavior. The dormant BWP timer may start when a BWP switches to a particular BWP. The dormant BWP timer may start or be restarted upon data scheduling or data transmission may be performed on the particular BWP. The dormant BWP timer may be stopped when a BWP switches to a BWP other than the particular BWP. Upon expiration, a UE may transition a serving cell to a dormancy behavior (e.g., the BWP switches to a dormant BWP). The particular BWP may include any of a default BWP, an initial BWP if default BWP is not configured, and a BWP configured by the BS.

A cell group dormancy timer may be configured by the BS for a group of serving cells. The base station may configure the cell group dormancy timer for a group of serving cells.

In a first case, the cell group dormancy timer may be associated with all service cells in a group. The cell group dormancy timer may start/restart/stop according to BWP switching or data scheduling on all cells of the group of serving cells. When the cell group dormancy timer expires, cells in the cell group may transition to a dormancy behavior.

In a second case, the cell group dormancy timer may be associated with a primary serving cell in a group of serving cells. The timer may start/restart/stop according to BWP switching or data scheduling on the primary serving cell. When the cell group dormancy timer expires, all cells in the cell group may transition to a dormancy behavior.

The BWP inactivity timer may be reused. Upon expiry of a BWP inactivity timer, the UE may transition a corresponding serving cell to a dormancy behavior. The BS may indicate whether to transition to a dormancy behavior or a default BWP upon expiry of a BWP inactivity timer. Alternatively, if a dormant BWP is configured, the UE may transition a serving cell to a dormancy behavior upon the timer expiring.

The BS may determine whether uplink activity is required or allowed on a serving cell in dormancy behavior. A bit may be indicative of each configured uplink activity (e.g., physical uplink control channel (PUCCH), SRS). One bit may be per each uplink activity.

Example Embodiment 1

Example Embodiment 1 may relate to identifying a BWP to activate when a serving cell transitions from a dormancy behavior to a non-dormant (or active) state.

In transitioning a serving cell from a dormancy behavior to a non-dormancy behavior, the UE may perform BWP switching to a default BWP. The UE may perform BWP switching to a first active downlink BWP. The UE may perform BWP switching to a first active downlink BWP and a first active uplink BWP.

The UE may perform BWP switching to a BWP configured by the BS. The BWP may be configured to be activated when transitioning the serving cell from a dormancy behavior to a non-dormancy behavior. The BWP may include one of a downlink BWP or an uplink BWP. The BS may configure a downlink BWP and a uplink BWP, and the UE may perform BWP switching to the configured downlink BWP and uplink BWP for downlink and uplink transmission.

The BS may provide a BWP identifier (ID) in the DCI that can be used to transition multiple serving cell or serving cell groups from a dormancy behavior to a non-dormancy behavior. The UE may perform BWP switching to an BWP as identified by the BWP ID for the serving cell.

A default BWP may be identified by a default BWP ID. Similarly, a first active downlink BWP may be identified by a first active downlink BWP ID and a first active uplink BWP may be identified by a first uplink BWP ID configured by the BS for a serving cell.

Accordingly, the BS may determine a BWP to be activated when a serving cell is transited from a dormancy behavior to a non-dormancy behavior. The BS can then schedule data transmission on the determined BWP.

Figure 2:
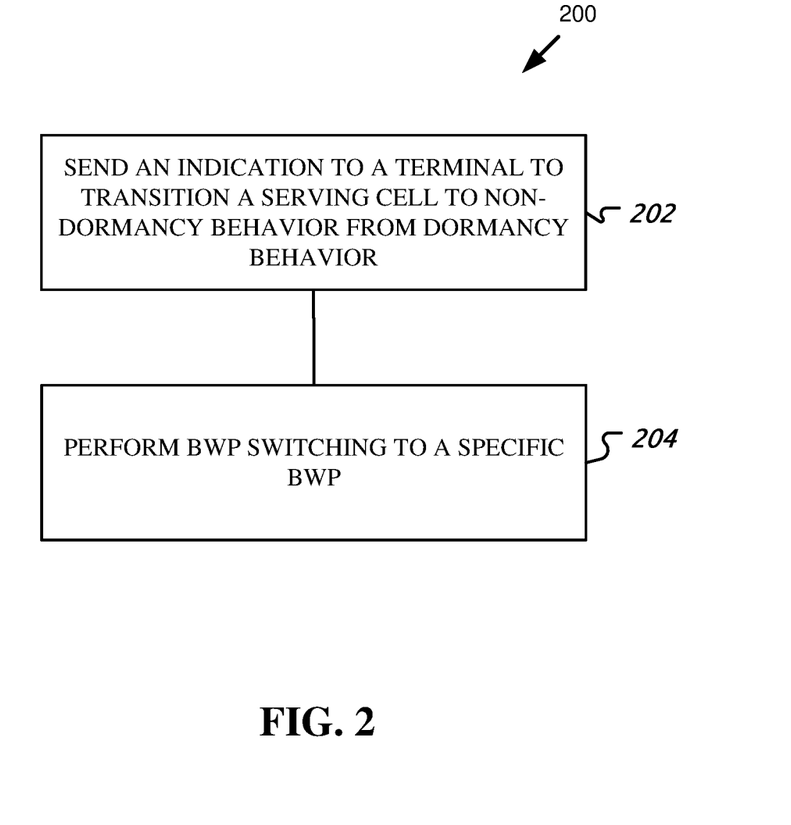
FIG. 2 is a block diagram of an example method to perform BWP switching to a specific BWP.

FIG. 2 is a block diagram of an example method 200 to perform BWP switching to a specific BWP. The method may include sending an indication to a terminal to transition a serving cell to non-dormancy behavior from dormancy behavior (block 202). The method may also include performing BWP switching to a specific BWP (block 204).

Example Embodiment 2

Example Embodiment 2 may relate to autonomous transitioning from a non-dormancy behavior to a dormancy behavior.

In many cases, a BS can configure a BWP inactivity timer for a serving cell. The BWP inactivity timer may be started or restated when switching the active BWP to a BWP that is not a default BWP if configured, or a BWP that is not initial BWP if a default BWP is not configured. The BWP inactivity timer may be started or restarted when a data scheduling or data transmission is performed on the current active BWP. Upon expiry of a BWP inactivity timer, the UE may perform BWP switching to default BWP if configured, or initial BWP if default BWP is not configured.

A first case may relate to redefining a BWP inactivity timer. A UE may transition the serving cell to a dormancy behavior when a BWP inactivity timer expires. In some embodiments, the BS may identify whether to transition to a dormancy behavior upon expiry of a BWP inactivity timer via any of a radio resource control (RRC) message, medium access control (MAC) control element (CE) message, and a DCI message to the UE. The indication by the BS may be associated with a serving cell, a specific group of cells, or all serving cells configured to the UE. The UE may apply the indication to a specific serving cell, serving cells in a specific group of cells, or any serving cells configured to the UE.

In some embodiments, as long as a dormant BWP is configured for a serving cell, the UE may transition a serving cell to a dormancy behavior upon expiry of a BWP inactivity timer (i.e. no explicit indication may be needed).

Accordingly, the BS may redefine UE behavior upon expiry of a BWP inactivity timer as well as an extra timer to control an autonomous transition to a dormancy behavior. By transitioning to a dormancy behavior after a period of inactivity, the UE may achieve greater power saving.

Figure 3:
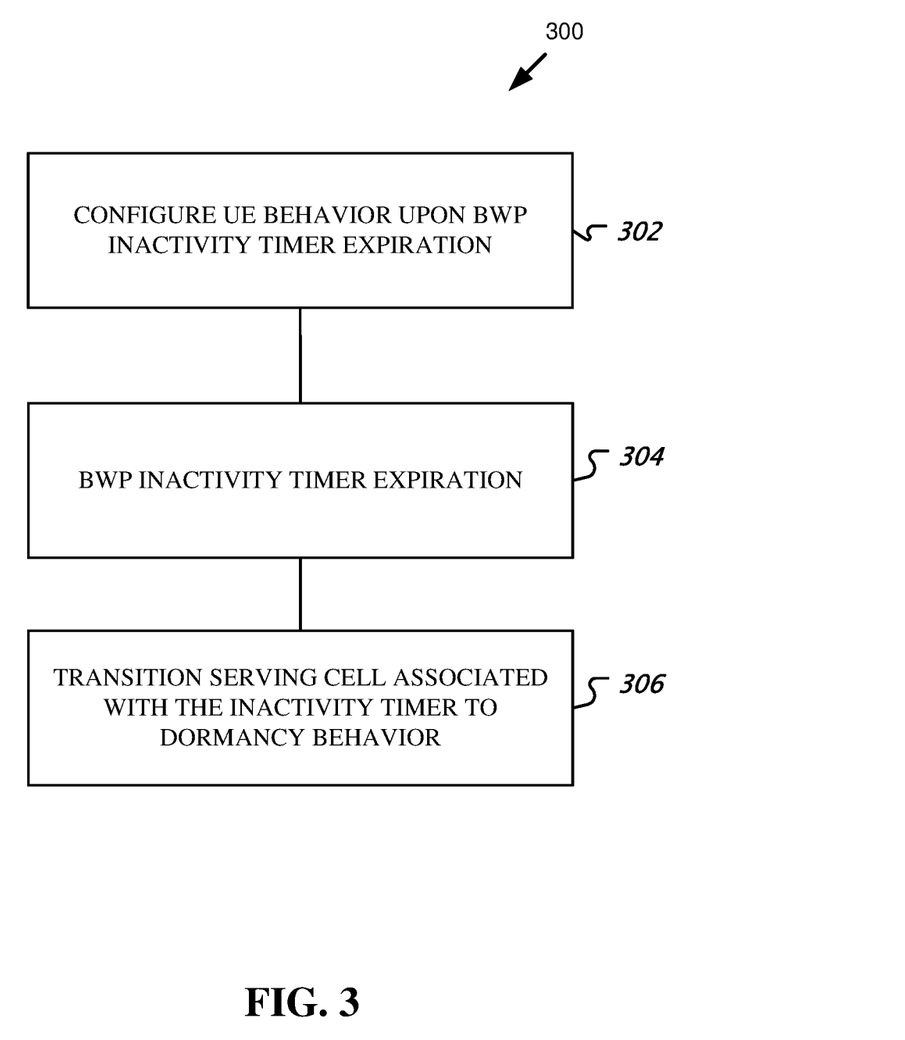
FIG. 3 is a block diagram of an example method for transitioning a serving cell to dormancy behavior responsive to an expiration of an inactivity timer.

FIG. 3 is a block diagram of an example method 300 for transitioning a serving cell to dormancy behavior responsive to an expiration of an inactivity timer. The method may include configuring UE behavior upon BWP inactivity timer expiration (block 302). The method may include an expiration of a BWP inactivity timer (block 304). The method may also include transitioning a serving cell to dormancy behavior responsive to an expiration of an inactivity timer (block 306).

A second case may relate to a dormancy timer for a serving cell. A BS may configure the dormancy timer configuration for a UE. The dormancy timer configuration may be indicated for a specific serving cell, a specific cell group, a subset of serving cells of a cell group, or serving cells of a specific frequency range such as FR1 and FR2, or all serving cells that can transition to a dormancy behavior.

The UE may apply the configuration to related serving cells. For example, for serving cell 1, the BS can configure dormancy timer configuration A. In this example, the UE can apply dormancy timer configuration A to serving cell 1. For serving cell group 2, the BS can configure dormancy timer configuration B. In this example, the UE can apply dormancy timer configuration B to all serving cells within the cell group 2.

For a serving cell configured with a dormancy timer configuration, a dormancy timer may be started upon BWP switching to a particular BWP. In some embodiments, the dormancy timer may be started or restated upon data scheduling or data transmission is performed on the particular BWP. The dormancy timer may be stopped upon BWP switching to a BWP that is not the particular BWP. The dormancy timer may be stopped upon BWP switching to dormant BWP according to a signal received from the BS. The dormant BWP timer length may be configured by BS via any of an RRC message, a MAC CE, or a DCI.

In some embodiments, the particular BWP may be the default BWP if it is configured for the serving cell. In other embodiments the particular BWP may be an initial BWP if the default BWP is not configured for the serving cell. The particular BWP may be configured by BS via an RRC message, or a MAC CE, or a DCI.

In this case, the UE may transition the serving cell to a dormancy behavior after a time of inactivity in data scheduling or data transmission on the particular BWP. If a particular BWP is a default BWP if it is configured or an initial BWP if it is not configured, after an inactivity period, the BWP may switch to a default BWP to save UE power. After another period of inactivity, the UE may transition an active BWP to a dormant BWP for further UE power saving.

When a particular BWP is configured by the BS explicitly via signaling, the BS can control when the dormancy timer for the BWP is started. For example, the BS may configure a BWP with large bandwidth as the particular BWP. Accordingly, the BWP with large bandwidth may transition to a dormancy behavior for this serving cell after a period of inactivity.

Figure 4:
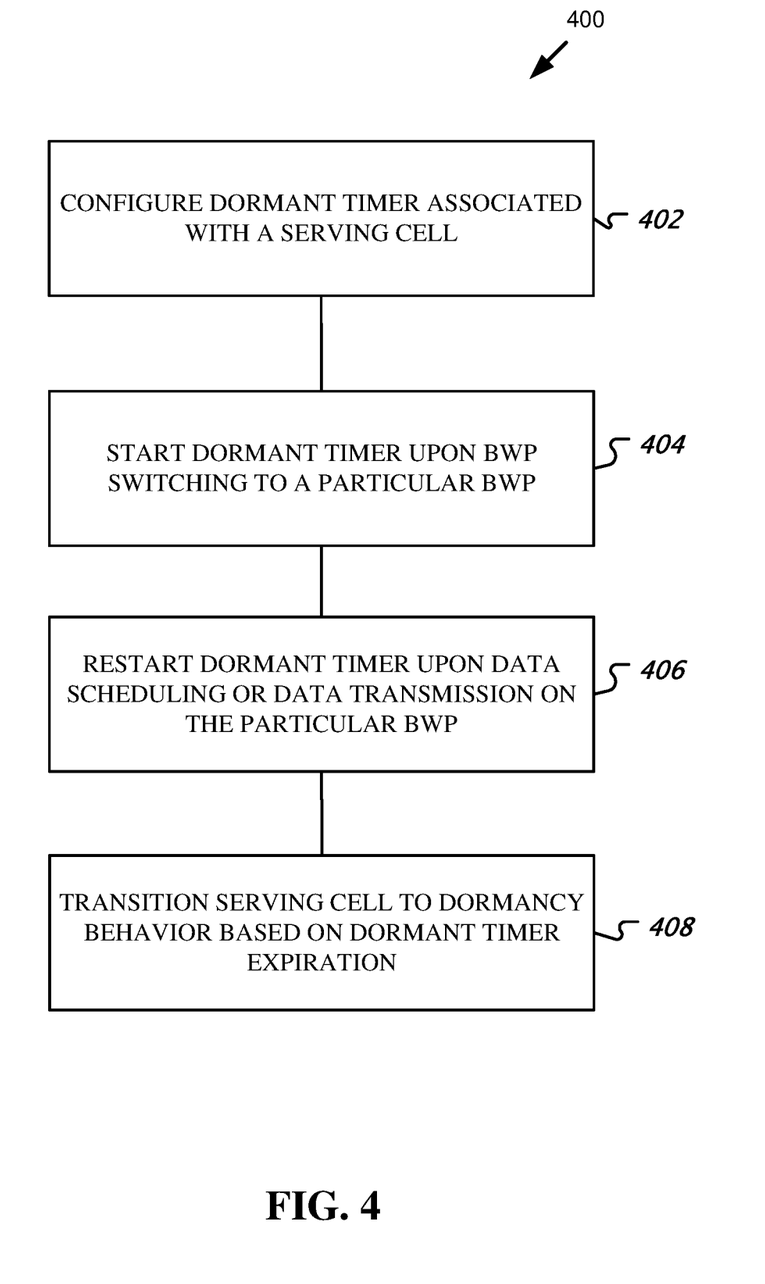
FIG. 4 is a block diagram of an example method for transitioning a serving cell to dormancy behavior based on an expiration of a dormant timer.

FIG. 4 is a block diagram of an example method 400 for transitioning a serving cell to dormancy behavior based on an expiration of a dormant timer. The method may include configuring a dormant timer associated with a serving cell (block 402). The method may also include starting a dormant timer upon BWP switching to a particular BWP (block 404). The method may also include restarting a dormant timer upon data scheduling or data transmission to the particular BWP (block 406). The method may also include transitioning a serving cell to dormancy behavior based on an expiration of a dormant timer (block 408).

In a third case, a dormant time may be configured for a group of serving cells. The BS may configure the dormancy timer configuration to the UE for a group of serving cells. The group of serving cells can be a secondary cell group (SCG), a master cell group (MCG), a subset of the SCG, a subset of the MCG, a subset of all serving cells configured to the UE, or the serving cells belonging to a frequency range (e.g. FR1 or FR2).

For a group of serving cells configured with a dormancy timer configuration, a single dormancy timer may be associated with the group of serving cells. The dormancy timer may be started or restarted when data scheduling or transmission is performed on any serving cell of the group of serving cells. The dormancy timer may be started when active BWP of any serving cell belongs to the group of serving cells is a particular BWP of the serving cell. The dormancy timer may be started when active BWP of all serving cells belongs to the group of serving cells is a particular BWP of the serving cell. The particular BWP may be the default BWP if it is configured for the serving cell, or an initial BWP if the default BWP is not configured for the serving cell. The particular BWP may be configured by BS via an RRC message, a MAC CE, or a DCI. The particular BWP may be any BWP except the dormant BWP of the serving cell.

Upon dormancy timer expiration, the UE may transition a serving cell of the group of serving cells to a dormancy behavior if the serving cell is not in the dormancy behavior or a deactivated state. In some embodiments, the UE may transition each serving cell of the group of serving cells to a dormancy behavior if it is not in the dormancy behavior or a deactivated state.

The dormancy timer may be stopped when all serving cells of the group of serving cells are transited to a dormancy behavior or deactivated state. The transition to a dormancy behavior may be performed according to signaling transmitted from BS or may be performed due to expiration of dormancy timers associated with each serving cell, such as case 2 as described above.

In some embodiments, a single dormancy timer may be associated with one particular serving cell belongs to the group of serving cells. In the present embodiments, the particular serving cell may be a primary serving cell of a group of serving cells.

Upon dormancy timer expiration, the UE may transition a serving cell of the group of serving cells to a dormancy behavior if the serving cell is not in the dormancy behavior and not in a deactivated state. In some embodiments, the UE may transmit each serving cell of the group of serving cells to a dormancy behavior if it is not in a dormancy behavior and not in a deactivated state.

The dormancy timer may be stopped when all serving cells of the group of serving cells are transitioned to a dormancy behavior or deactivated state. The dormancy timer may be started upon BWP switching to a particular BWP of the primary serving cell. The dormancy timer may be started or restated upon data scheduling or data transmission is performed on particular BWP of the primary serving cell.

In some embodiments, the particular BWP may be the default BWP if it is configured for the serving cell, or an initial BWP if the default BWP is not configured for the serving cell. The particular BWP may be configured by BS via an RRC message. The particular BWP may be any BWP except the dormant BWP of the serving cell. The group of serving cells may be a SCG configured to the UE. The primary serving cell may include a PSCell of SCG. When the dormancy timer expires, the UE may transition all serving cells of SCG to a dormancy behavior if the serving is not in a dormancy behavior and not in a deactivated state.

Figure 5:
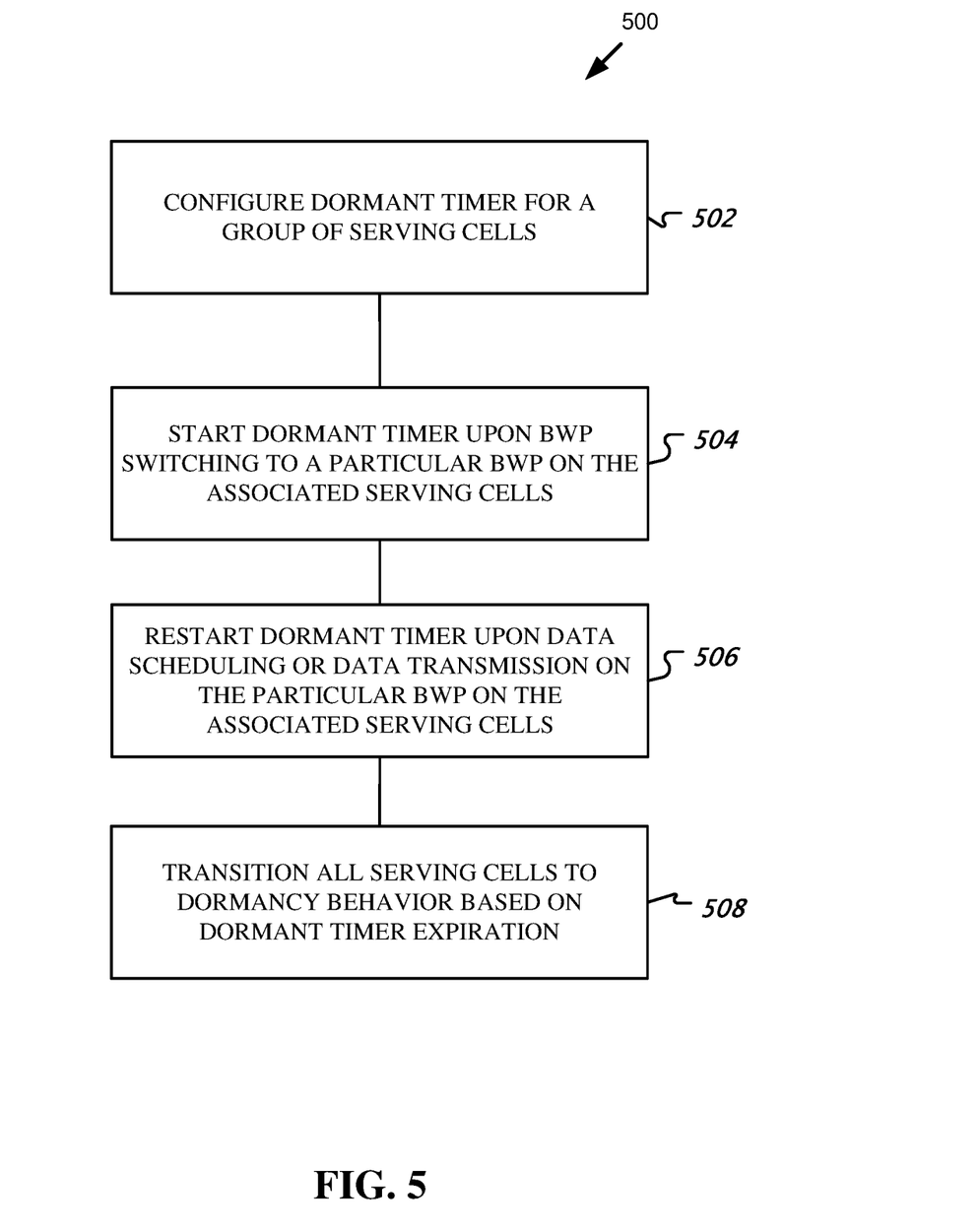
FIG. 5 is a block diagram of an example method for transitioning all serving cells to dormancy behavior based on an expiration of a dormant timer.

FIG. 5 is a block diagram of an example method 500 for transitioning all serving cells to dormancy behavior based on an expiration of a dormant timer. The method may include configuring a dormant timer for a group of cells (block 502). The dormant timer may be associated with a primary cell or all cells of a cell group. The method may include starting a dormant timer upon BWP switching to a particular BWP on the associated serving cells (block 504). The method may include restarting a dormant timer upon data scheduling or data transmission on the particular BWP on the associated serving cells (block 506). The method may include transitioning all serving cells to dormancy behavior based on an expiration of a dormant timer (block 508).

Example Embodiment 3

Example Embodiment 3 generally relates to uplink behavior configuration. The BS can configure whether a certain uplink activity is performed on a serving cell in a dormancy behavior. The uplink activities may include any of a PUCCH transmission, an SRS transmission, a configured grant transmission, a PRACH transmission, etc.

The BS may provide an indication to the UE via an RRC message, a MAC CE, or a DCI. The BS may indicate whether an uplink activity is performed on a serving cell in a dormancy behavior by any of: a bit in an RRC message, a MAC CE, or a DCI to indicate that all configured uplink activities are required to perform, or one bit per one kind of uplink activity to indicate the corresponding uplink activity is required to perform (e.g., one bit for PUCCH transmission and one bit for SRS transmission).

The indication from the BS to UE can be per serving cell, per cell group, or per UE. When the indication is per serving cell, the indication may be associated to a specific serving cell. The UE may apply the indication to the specific serving cell when it is in a dormancy behavior. If the indication is per cell group, the indication may be associated to a specific group of cells. The UE may apply the indication to each serving cell in the specific group of cells when the serving cell is in a dormancy behavior. If the indication is per UE, the UE may apply the indication to each serving cells configured to the UE while the serving cell is in a dormancy behavior.

When an uplink activity is configured to be performed on a serving cell which in a dormancy behavior, the UE may perform the activity on the active uplink BWP when the serving cell is in a dormancy behavior.

Accordingly, the BS can configure which uplink activity is to be performed for a serving cell in a dormancy behavior with greater flexibility. In many cases, all uplink activities on the serving cell in dormancy behavior may not be allowed, and a serving cell configured with PUCCH (or a PUCCH serving cell) may not be transitioned to a dormancy behavior. In the present embodiments, a PUCCH serving cell can be transitioned to a dormancy behavior. Accordingly, the UE may achieve greater power saving.

Figure 6:
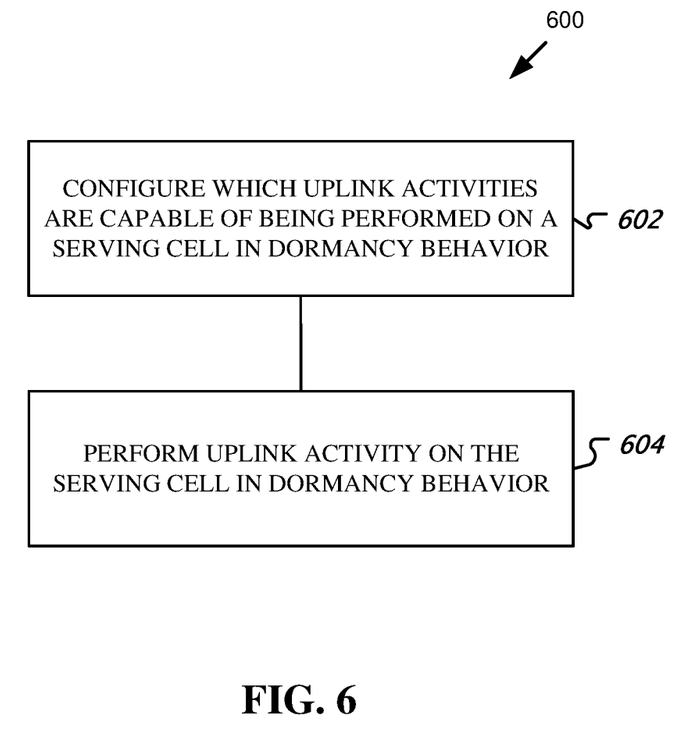
FIG. 6 is a block diagram of an example method for performing uplink activities on a serving cell in dormancy behavior.

FIG. 6 is a block diagram of an example method 600 for performing uplink activities on a serving cell in dormancy behavior. The method may include configuring which uplink activities are capable of being performed on a serving cell in dormancy behavior (block 602). The method may also include performing uplink activities on the serving cell in dormancy behavior (block 604).

Figure 7:
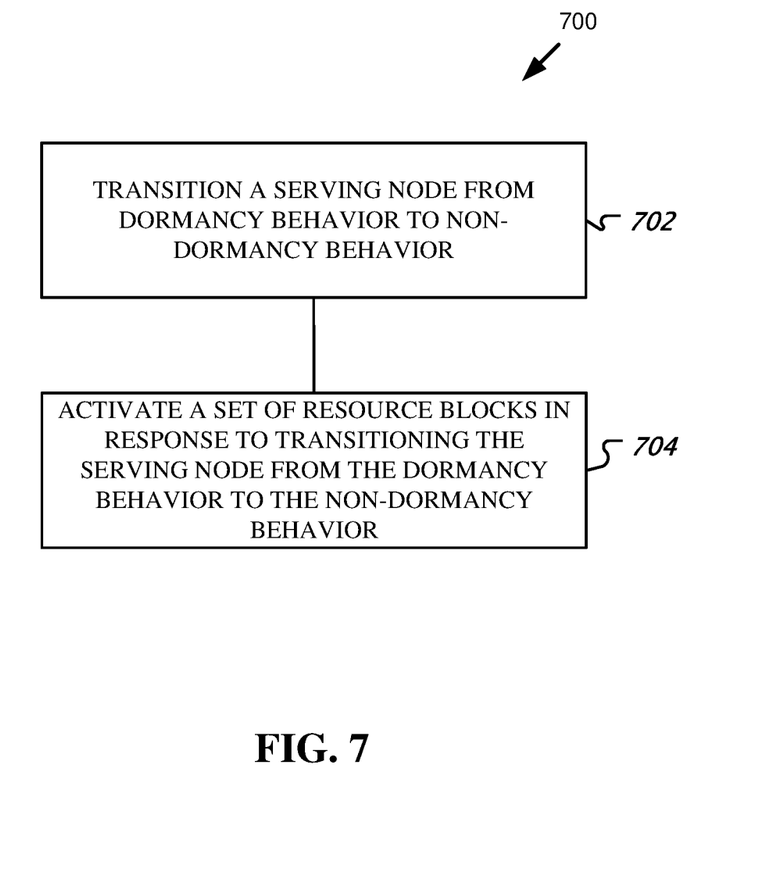
FIG. 7 is an example method for controlling activation of a BWP upon transitioning from dormancy behavior to non-dormancy behavior.

FIG. 7 is an example method 700 for controlling activation of a BWP upon transitioning from dormancy behavior to non-dormancy behavior. The method may include transitioning a serving cell from dormancy behavior to non-dormancy behavior (block 702). The method may also include activating a set of resource blocks in response to transitioning the serving cell from the dormancy behavior to the non-dormancy behavior (block 704).

In some embodiments, the set of resource blocks is a default bandwidth part (BWP) configured for the terminal.

In some embodiments, the set of resource blocks includes an initial BWP when the default BWP is not configured.

In some embodiments, the set of resource blocks includes a first active BWP.

In some embodiments, the serving cell is transitioned responsive to receiving a resource configuration message from a network cell that includes a radio resource control (RRC) message.

In some embodiments, the serving cell is transitioned responsive to receiving a resource configuration message from a network cell that includes a medium access control (MAC) message.

In some embodiments, the serving cell is transitioned responsive to receiving a resource configuration message from a network cell that includes downlink control information (DCI).

In some embodiments, the resource configuration message is indicative of a group of serving cells.

In another embodiment, a method for wireless communication comprises detecting, by a terminal, that a dormancy timer configured for a group of serving cells has expired. The method also includes transitioning, by the terminal, the group of serving cells from non-dormancy behavior to dormancy behavior responsive to detecting that the dormancy timer has expired.

In some embodiments, the resource configuration message is indicative of a primary serving cell included in a cell group.

In some embodiments, the method includes transitioning, by the terminal, the primary serving cell and cells included in the cell group from non-dormancy behavior to dormancy behavior responsive to an expiration of a dormancy timer.

In another embodiment, a method for wireless communication comprises detecting, by a terminal, that a dormancy timer has expired. The method also includes responsive to detecting that the dormancy timer has expired, transitioning, by the terminal, a serving cell from non-dormancy behavior to dormancy behavior.

In some embodiments, the method includes starting, by the terminal, the dormancy timer upon a set of resource blocks switching to a specified BWP.

In some embodiments, the method includes restarting, by the terminal, the dormancy timer upon performing data transmission on a specified BWP.

In some embodiments, the method includes stopping, by the terminal, the dormancy timer responsive to switching a set of resource blocks to another BWP that does not include the specified BWP.

In some embodiments, transitioning from the non-dormancy behavior to the dormancy behavior includes switching a set of resource blocks to a dormant BWP.

In some embodiments, the specified BWP is any of a default BWP, an initial BWP, and a BWP configured by the network cell.

In another embodiment, a method for wireless communication comprises receiving, by the terminal, an uplink activity configuration message from a network cell, the uplink activity configuration message indicative of uplink activities that are capable of being performed by a serving cell in dormancy behavior. The method also includes performing, by the terminal, any uplink activity identified in the uplink activity configuration message by the serving cell in the dormancy behavior.

In some embodiments, the uplink activity configuration message includes a bitmap with one bit representative of each configured uplink activity capable of being performed by the serving cell in the dormancy behavior.

In another embodiment, a method for wireless communication comprises configuring, by a network cell, a set of resource blocks for a terminal to activate in response to the terminal transitioning a serving cell from dormancy behavior to non-dormancy behavior. The method also includes transmitting, by the network cell, a resource configuration message to a terminal, the resource configuration message indicative of the set of resource blocks for the terminal to activate in response to the terminal transitioning the serving cell from dormancy behavior to non-dormancy behavior.

In some embodiments, the set of resource blocks is a default bandwidth part (BWP) configured by the network cell.

In some embodiments, the set of resource blocks includes an initial BWP when the default BWP is not configured by the network cell.

In some embodiments, the set of resource blocks includes a first active BWP.

In some embodiments, the resource configuration message includes a radio resource control (RRC) message.

In some embodiments, the resource configuration message includes a medium access control (MAC) message.

In some embodiments, the resource configuration message includes downlink control information (DCI).

In some embodiments, the resource configuration message is indicative of a group of serving cells.

In another embodiment, a method for wireless communication comprises configuring, by a network cell, a dormancy timer for a group of serving cells. The method also includes sending, by the network cell, a first message to a terminal indicative of the configured dormancy timer for the group of cells.

In some embodiments, the terminal is configured to transition the group of serving cells from non-dormancy behavior to dormancy behavior responsive to an expiration of the dormancy timer.

In some embodiments, the resource configuration message is indicative of a primary serving cell included in a cell group.

In some embodiments, the terminal is configured to transition the primary serving cell and cells included in the cell group from non-dormancy behavior to dormancy behavior responsive to an expiration of a dormancy timer.

Wireless Communication System

Figure 8:
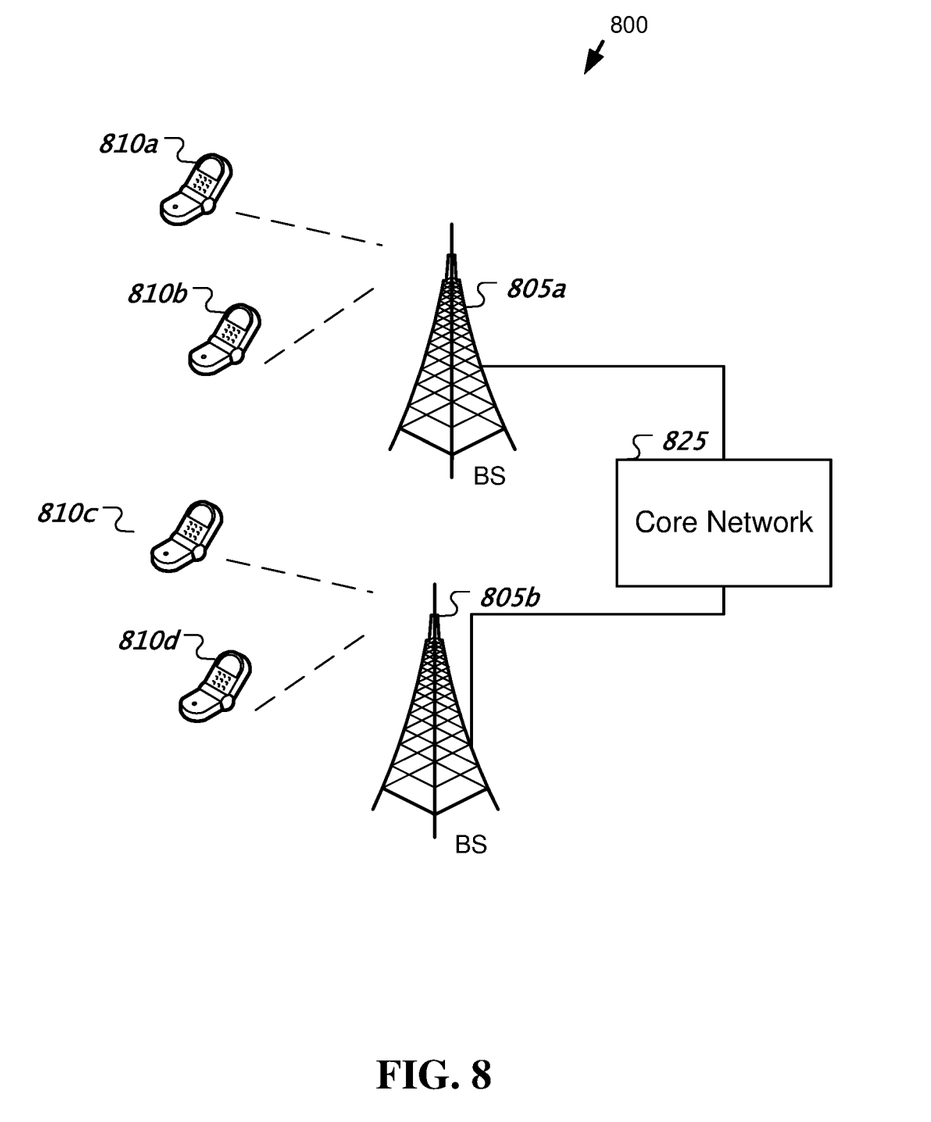
FIG. 8 shows an example of a wireless communication system where techniques in accordance with one or more embodiments of the present technology can be applied.

FIG. 8 shows an example of a wireless communication system where techniques in accordance with one or more embodiments of the present technology can be applied. A wireless communication system 800 can include one or more base stations (BSs) 805a, 805b, one or more wireless devices 810a, 810b, 810c, 810d, and a core network 885. A base station 805a, 805b can provide wireless service to wireless devices 810a, 810b, 810c and 810d in one or more wireless sectors. In some implementations, a base station 805a, 805b includes directional antennas to produce two or more directional beams to provide wireless coverage in different sectors.

The core network 885 can communicate with one or more base stations 805a, 805b. The core network 885 provides connectivity with other wireless communication systems and wired communication systems. The core network may include one or more service subscription databases to store information related to the subscribed wireless devices 810a, 810b, 810c, and 810d. A first base station 805a can provide wireless service based on a first radio access technology, whereas a second base station 805b can provide wireless service based on a second radio access technology. The base stations 805a and 805b may be co-located or may be separately installed in the domain according to the deployment scenario. The wireless devices 810a, 810b, 810c, and 810d can support multiple different radio access technologies. In some embodiments, the base stations 805a, 805b may be configured to implement some techniques described in the present document. The wireless devices 810a to 810d may be configured to implement some techniques described in the present document.

In some implementations, a wireless communication system can include multiple networks using different wireless technologies. A dual-mode or multi-mode wireless device includes two or more wireless technologies that could be used to connect to different wireless networks.

Figure 9:
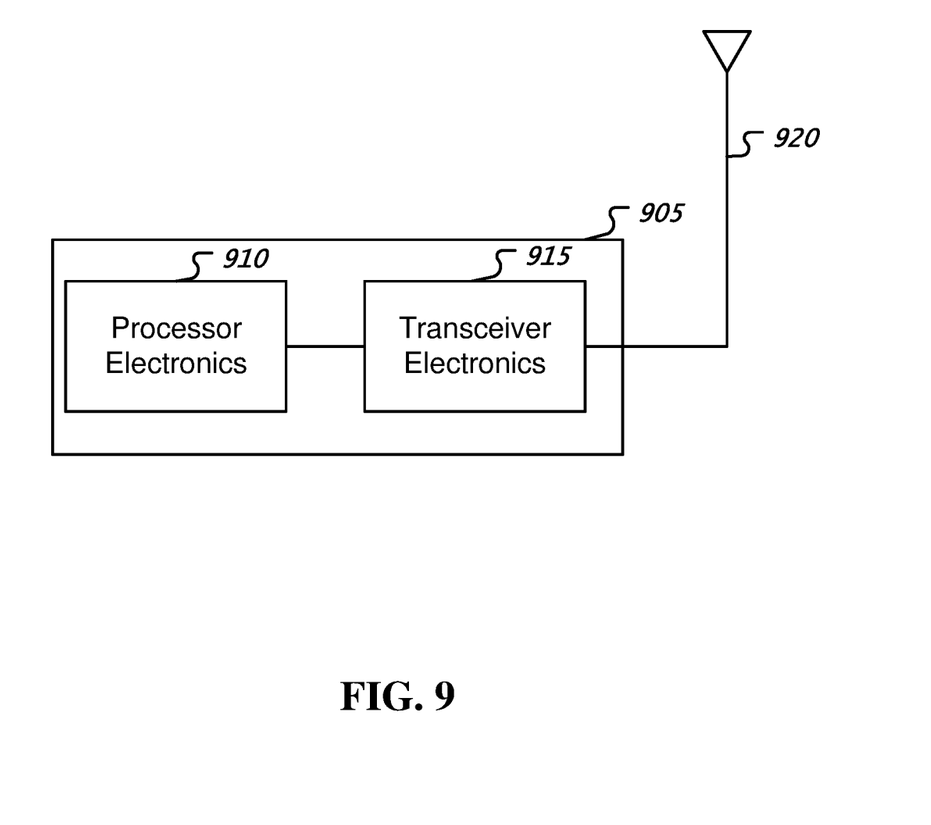
FIG. 9 is a block diagram representation of a portion of a hardware platform.

FIG. 9 is a block diagram representation of a portion of a hardware platform. The communication node as described in the present application may include the hardware platform as described with respect to FIG. 9. A hardware platform 905 such as a network device or a base station or a wireless device (or UE) can include processor electronics 910 such as a microprocessor that implements one or more of the techniques presented in this document. The hardware platform 905 can include transceiver electronics 915 to send and/or receive wired or wireless signals over one or more communication interfaces such as antenna 920 or a wireline interface. The hardware platform 905 can implement other communication interfaces with defined protocols for transmitting and receiving data. The hardware platform 905 can include one or more memories (not explicitly shown) configured to store information such as data and/or instructions. In some implementations, the processor electronics 910 can include at least a portion of the transceiver electronics 915. In some embodiments, at least some of the disclosed techniques, modules or functions and network nodes are implemented using the hardware platform 905.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for enforcement by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an enforcement environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (domain programmable gate array) or an ASIC (application specific integrated circuit).

Processors suitable for the enforcement of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method for wireless communication, comprising:
receiving, by a terminal, a resource configuration message configured by a network cell, the resource configuration message indicative of a set of resource blocks including a bandwidth part (BWP) configured by the network cell, wherein the resource configuration message is further indicative of a primary serving cell included in a cell group;
transitioning, by the terminal, a serving cell from dormancy behavior to non-dormancy behavior; and
performing, by the terminal, a BWP switching to the BWP included in the set of resource blocks in response to transitioning the serving cell from the dormancy behavior to the non-dormancy behavior,
wherein the method further comprises transitioning the primary serving cell from the non-dormancy behavior to the dormancy behavior responsive to an expiration of a dormancy timer configured by the network cell.

2. The method of claim 1, wherein the bandwidth part is a default bandwidth part (BWP) configured for the terminal or includes a first active BWP.

3. The method of claim 2, wherein the set of resource blocks includes an initial BWP when the default BWP is not configured.

4. The method of claim 1, wherein the serving cell is transitioned responsive to the receiving of the resource configuration message from the network cell that includes a radio resource control (RRC) message, a medium access control (MAC) message, or downlink control information (DCI).

5. The method of any of claim 1, wherein the resource configuration message is indicative of a group of serving cells or a primary serving cell included in a cell group.

6. A method for wireless communication, comprising:
configuring, by a network cell, a set of resource blocks for a terminal to activate in response to the terminal transitioning a serving cell from dormancy behavior to non-dormancy behavior; and
transmitting, by the network cell, a resource configuration message to the terminal, the resource configuration message indicative of the set of resource blocks including a bandwidth part (BWP) that is configured by the network cell for the terminal to perform a BWP switching to the BWP included in the set of resource blocks in response to the terminal transitioning the serving cell from the dormancy behavior to the non-dormancy behavior,
wherein the resource configuration message is indicative of a primary serving cell included in a cell group, and
wherein the terminal is configured to transition the primary serving cell from the non-dormancy behavior to the dormancy behavior responsive to an expiration of a dormancy timer configured by the network cell.

7. The method of claim 6, wherein the bandwidth part is a default bandwidth part (BWP) configured by the network cell or includes a first active BWP.

8. The method of claim 7, wherein the set of resource blocks includes an initial BWP when the default BWP is not configured by the network cell.

9. The method of claim 6, wherein the resource configuration message includes a radio resource control (RRC) message, a medium access control (MAC) message, or downlink control information (DCI).

10. The method of claim 6, wherein the resource configuration message is further indicative of a group of serving cells.

11. The method of claim 10, wherein the terminal is further configured to transition the group of serving cells from the non-dormancy behavior to the dormancy behavior responsive to the expiration of the dormancy timer.

12. The method of claim 6, further comprising:
sending, by the network cell, a first message to the terminal indicative of the dormancy timer.

13. An apparatus for wireless communication, the apparatus comprising a processor operating as a network cell and configured to:
configure a set of resource blocks for a terminal to activate in response to the terminal transitioning a serving cell from dormancy behavior to non-dormancy behavior; and
transmit a resource configuration message to the terminal, the resource configuration message indicative of the set of resource blocks including a bandwidth part (BWP) that is configured by the network cell for the terminal to perform a BWP switching to the BWP included in the set of resource blocks in response to the terminal transitioning the serving cell from the dormancy behavior to the non-dormancy behavior,
wherein the resource configuration message is indicative of a primary serving cell included in a cell group, and
wherein the terminal is configured to transition the primary serving cell from the non-dormancy behavior to the dormancy behavior responsive to an expiration of a dormancy timer configured by the network cell.

14. The apparatus of claim 13, wherein the bandwidth part is a default bandwidth part (BWP) configured by the network cell or includes a first active BWP.

15. The apparatus of claim 14, wherein the set of resource blocks includes an initial BWP when the default BWP is not configured by the network cell.

16. The apparatus of claim 13, wherein the resource configuration message includes a radio resource control (RRC) message, a medium access control (MAC) message, or downlink control information (DCI).

17. The apparatus of claim 13, wherein the resource configuration message is further indicative of a group of serving cells.

18. The apparatus of claim 17, wherein the terminal is further configured to transition the group of serving cells from the non-dormancy behavior to the dormancy behavior responsive to the expiration of the dormancy timer.

19. The apparatus of claim 13, wherein the processor is further configured to:
send a first message to the terminal indicative of the dormancy timer.

* * * * *